(12) United States Patent
Drerup et al.

(10) Patent No.: US 7,065,595 B2
(45) Date of Patent: Jun. 20, 2006

(54) METHOD AND APPARATUS FOR BUS ACCESS ALLOCATION

(75) Inventors: Bernard C. Drerup, Austin, TX (US); Jaya P. Ganasan, Youngsville, NC (US); Richard G. Hofmann, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 10/249,271

(22) Filed: Mar. 27, 2003

(65) Prior Publication Data

US 2004/0193767 A1 Sep. 30, 2004

(51) Int. Cl.
*G06F 13/362* (2006.01)

(52) U.S. Cl. ...................................... 710/117; 710/116

(58) Field of Classification Search ........ 710/110–111, 710/116–118, 241, 244, 113, 124
See application file for complete search history.

(56) References Cited

U.S. PATENT DOCUMENTS

| | | | | |
|---|---|---|---|---|
| 4,554,628 A | * | 11/1985 | Bell ........................... | 710/117 |
| 5,057,997 A | * | 10/1991 | Chang et al. ................ | 718/108 |
| 5,151,994 A | * | 9/1992 | Wille et al. .................. | 710/116 |
| 5,327,540 A | | 7/1994 | Heil et al. | |
| 5,388,228 A | * | 2/1995 | Heath et al. ................ | 710/123 |
| 5,416,910 A | | 5/1995 | Moyer et al. | |
| 5,430,848 A | * | 7/1995 | Waggener ................... | 710/123 |
| 5,546,547 A | * | 8/1996 | Bowes et al. ............... | 710/114 |
| 5,623,672 A | * | 4/1997 | Popat .......................... | 710/240 |
| 5,802,330 A | | 9/1998 | Dutton | |
| 5,805,840 A | * | 9/1998 | Dutton ........................ | 710/116 |
| 6,016,528 A | * | 1/2000 | Jaramillo et al. ........... | 710/243 |
| 6,026,459 A | * | 2/2000 | Huppenthal .................. | 710/116 |
| 6,035,360 A | | 3/2000 | Doidge et al. | |
| 6,076,127 A | | 6/2000 | Chin et al. | |
| 6,088,751 A | * | 7/2000 | Jaramillo .................... | 710/116 |
| 6,138,200 A | | 10/2000 | Ogilvie | |
| 6,141,715 A | | 10/2000 | Porterfield | |
| 6,212,620 B1 | * | 4/2001 | Kawasaki et al. ............ | 712/32 |
| 6,279,063 B1 | * | 8/2001 | Kawasaki et al. .......... | 710/110 |
| 6,311,244 B1 | * | 10/2001 | Sheafor et al. ............. | 710/107 |
| 6,363,445 B1 | * | 3/2002 | Jeddeloh ...................... | 710/113 |
| 6,446,151 B1 | * | 9/2002 | Fischer et al. .............. | 710/124 |
| 6,467,002 B1 | * | 10/2002 | Yang .......................... | 710/116 |
| 6,473,817 B1 | * | 10/2002 | Jeddeloh ...................... | 710/113 |
| 6,505,265 B1 | * | 1/2003 | Ishikawa et al. ............ | 710/113 |

(Continued)

*Primary Examiner*—Paul R. Myers
*Assistant Examiner*—Ryan Stiglic
(74) *Attorney, Agent, or Firm*—Richard F. Frankeny; Winstead Sechrest & Minink P.C.; Todd M. C. Li

(57) ABSTRACT

A method for granting access to a bus is disclosed where a fair arbitration is modified to account for varying conditions. Each bus master (BM) is assigned a Grant Balance Factor value (hereafter GBF) that corresponds to a desired bandwidth from the bus. Arbitration gives priority BMs with a GBF greater than zero in a stratified protocol where requesting BMs with the same highest priority are granted access first. The GBF of a BM is decremented each time an access is granted. Requesting BMs with a GBF equal to zero are fairly arbitrated when there are no requesting BMs with GBFs greater than zero wherein they receive equal access using a frozen arbiter status. The bus access time may be partitioned into bus intervals (BIs) each comprising N clock cycles. BIs and GBFs may be modified to guarantee balanced access over multiple BIs in response to error conditions or interrupts.

40 Claims, 7 Drawing Sheets

U.S. PATENT DOCUMENTS

| | | | |
|---|---|---|---|
| 6,513,089 B1 * | 1/2003 | Hofmann et al. | 710/309 |
| 6,718,422 B1 * | 4/2004 | Kelley et al. | 710/309 |
| 6,741,096 B1 * | 5/2004 | Moss | 326/37 |
| 6,907,491 B1 * | 6/2005 | Moss | 710/309 |
| 2002/0007430 A1 * | 1/2002 | Kawasaki et al. | 710/110 |
| 2002/0048280 A1 * | 4/2002 | Lee et al. | 370/468 |
| 2003/0088722 A1 * | 5/2003 | Price | 710/244 |
| 2003/0131168 A1 * | 7/2003 | Kauffman et al. | 710/244 |

* cited by examiner

FIG. 4C

METHOD AND APPARATUS FOR BUS ACCESS ALLOCATION

BACKGROUND OF INVENTION

The present invention relates in general to methods and apparatus for arbitrating access to a communication bus on an integrated circuit and, in particular, to the processor local bus (PLB) used on system-on-a-chip (SOC) implementations.

On-chip bus systems that are used to communicate between a number of functional units use various methods to arbitrate among bus masters that manage bus access for the function or device. Relative to access to the bus, a bus master is the transfer initiator and a slave is the transfer receptor. A bus master actually controls the bus paths on which the address and control signals flow. Once these are set up, the flow of data bits goes between the transfer initiator and the receptor. There are various types of arbitration schemes: round robin, daisy chain, centralized, distributed, etc. Each of the arbitration schemes attempts to provide the various bus master devices access that is fair or access that is based on a predetermined fixed priority sequence. The round robin arbitration scheme is a "fair" method that continuously repeats a sequence, such as the polling of a series of bus masters, one after the other, over and over again searching for an access request. For the round robin arbitration method, a bus master (BM) that requires a certain amount of guaranteed bandwidth may be starved from gaining sufficient access to the bus if one or more other BMs are also continuously requesting a bus access. At best, the BM will only be guaranteed 100/N percent of the bus bandwidth where N represents the number of continuously requesting BMs coupled to the bus. In a fixed arbitration method, the potential for starvation will also occur if the BM that is requesting the bandwidth is relegated to a secondary priority when another BM which has a higher priority continuously requests access to the bus.

A fair arbitration scheme is desirable, but it would be advantageous to have an arbitration scheme that was also able to guarantee selected BMs a certain bandwidth while not wasting bus resources if these selected BMs were not requesting a bus access. It also would be useful if a bandwidth selected for a device could be changed dynamically if system utilization indicated that the bandwidth requirements had changed. It would also be desirable to have an arbitration scheme that allowed BMs not assigned a certain bandwidth to be guaranteed a chance to access the bus if it was determined that they were being "locked" out by the arbitration scheme.

The efficient utilization of a bus in a system, where the data traffic environment may be continuously changing, is key to realizing the maximum performance capability of the system. There is, therefore, a need for a method and apparatus for better managing access to a bus so that selected BMs may be assigned a certain amount of bus access and thus a certain bandwidth while preventing other bus masters without assigned bandwidth from being locked out.

SUMMARY OF INVENTION

Each bus master (BM) that manages the access of a device or functional unit to a shared bus has a Grant Balance Factor value (hereafter GBF) assigned that defines its guaranteed access to the bus in relation to the other BMs. The GBF for each BM is stored in a Grant Balance Register (GBR) which is decremented by one each time the BM is granted access to the bus. In one embodiment, BMs with a GBF greater than zero are given priority to the bus in a "stratified" protocol. In this stratified protocol, requesting BMs with the same highest GBF are arbitrated first. Each time one of these BMs is granted an access, its GBF is decremented and its priority essentially drops to the next level. Fair arbitration continues among the requesting BMs with the highest GBF. If there are no requesting BMs with the highest GBF, requesting BMs with the "next" highest level GBF are arbitrated. The BMs that have an initial GBF equal to zero have no guaranteed priority but may still get access. If a requesting BM's GBR value decrements to zero, it may be treated with the same or a different priority than a requesting BM with an initial GBR equal to zero. However, if its GBR value has decremented to zero and there is no other requesting BM with a GBR value greater than zero or requesting BM with an initial GBF equal to zero, then its request may be serviced. Additionally, the time during which bus accesses are granted is partitioned into bus intervals (BIs) which may be programmed via an Arbitration Bus Interval (ABI) register. Bus activity is checked during each BI. If bus request activity drops below a predetermined level during a BI, the GBFs may be reset to a predetermined programmed value. If bus request activity drops below a predetermined level during a BI, an interrupt may be issued to stop the BI and the GBFs may be reset to a predetermined programmed value. If the BI has expired, the GBRs are reset to a predetermined programmed value.

The BI is set as a programmed number of k clock cycles. In this manner, a bus (e.g., a processor local bus (PLB)) access time may be partitioned into n BIs where each BI comprises k clock cycles. In this embodiment, a user should program the total number of access times for all BMs to be less than the total time allocated per BI. This should insure that all of the BMs have an access granted within a given BI. Each time a BM is granted an access, its GBF is decremented and its GBF is reset to a programmed value at the end of the BI. However, if all the GBFs have decremented to zero and the BI has not been reached, the arbiter will revert to a fair arbitration (e.g., round robin) to handle any requests from BMs that had initial GBFs equal to zero. BMs with a GBF equal to zero compete for bandwidth left over after all the BMs with a GBF greater than zero have been serviced to their level determined by their GBF. When there are multiple requesting BMs with a GBF equal to zero, it is possible that only some of them will get an access granted during a given BI. To insure that over multiple BIs these particular BMs will get an equal opportunity for an access request to be granted, the state of the arbiter's polling sequence is frozen at the end of a BI. During the next BI, the arbiter will continue from this frozen state when it is granting accesses to the requesting BMs with initial GBFs equal to zero. This guarantees that any one of these requesting BMs that was "locked out" from getting an access request granted during a BI will get a virtual higher priority in its next fair arbitration cycle.

In another embodiment, the BI is dynamically modified to vary bus accesses depending on system access requirements. Two error reporting mechanisms are employed by the arbiter when it is in the dynamic BI mode:

(a) an error is flagged if a user sets the BI too small such that requesting BMs that have GBFs greater than zero are locked out of receiving accesses to the bus. If all the GBFs greater than zero have not decremented to zero at the end of the BI, an error is flagged in a status register indicating the master identification (ID) of the requesting BM(s) that did not get an access request serviced during the particular BI.

(b) an error is flagged if requesting BMs that have a GBF equal to zero never or very seldom get the opportunity to have an access request serviced because the user has set the BI so small that only requesting BMs with a GBF greater than zero ever get access requests serviced. Likewise, if BMs with a GBF equal to zero never get an access request serviced over a number m of successive BIs, an error is flagged in the status register. The number m may be programmed as a variable value. Over m successive BIs, if it appears that the BI has been set too short, the arbiter may decide to increase the BI or modify the GBFs of selected BMs in the system. In either case, the arbiter ensures that a requesting BM that is being denied access to the bus is allowed greater opportunity to have an access granted in a subsequent BI.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF DRAWINGS

For a more complete understanding of the present invention, and the advantages thereof, reference is now made to the following descriptions taken in conjunction with the accompanying drawings, in which:

FIG. 4C illustrates how the frozen status of the arbiter guarantees equal access to requesting BMs with an initial GBF equal to zero.

DETAILED DESCRIPTION

Figure 1:
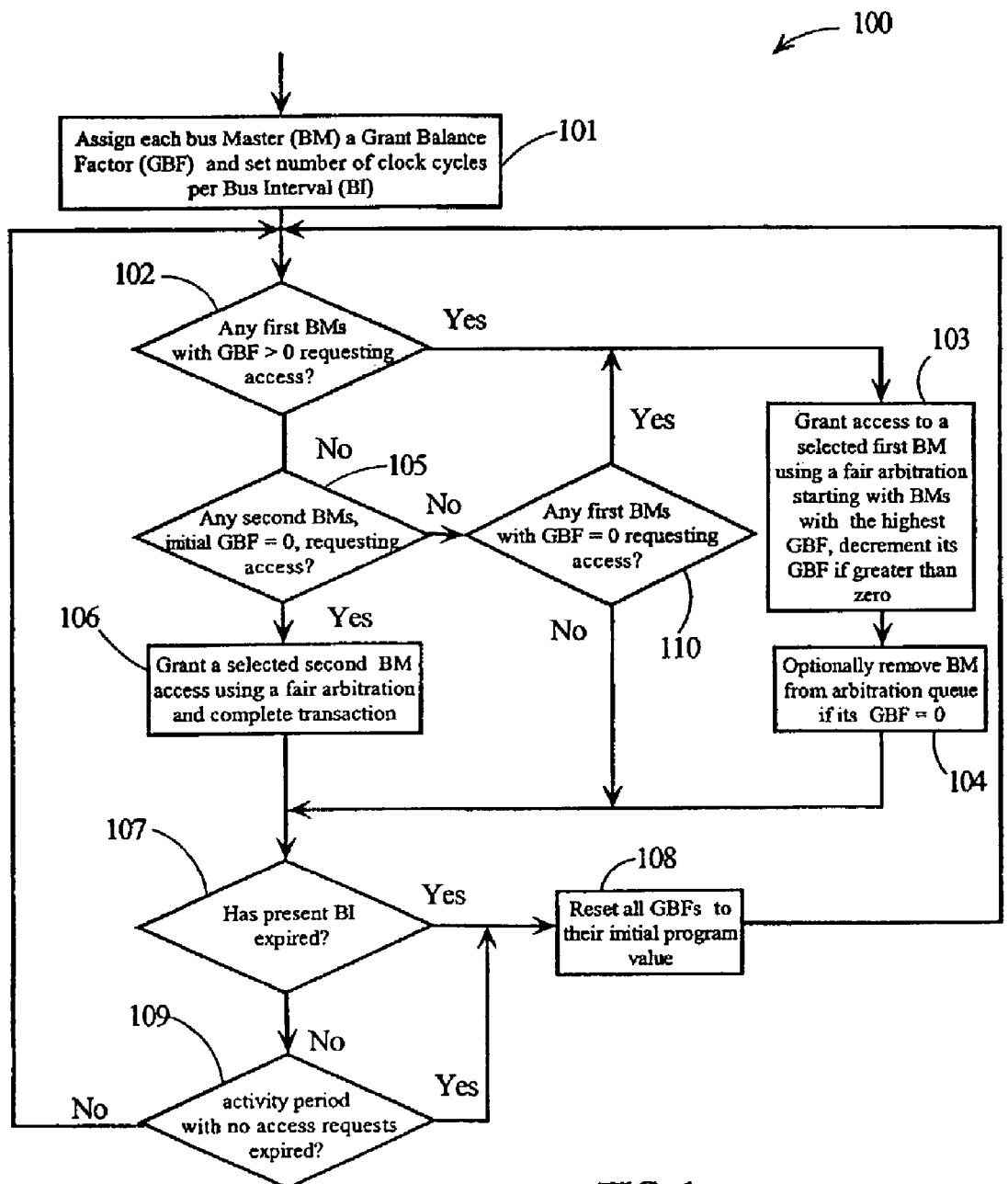
FIG. 1 is a flow diagram of method steps in one embodiment of the present invention with Grant Balance Factor values assigned to the bus masters (BMs)

In the following description, numerous specific details may be set forth to provide a thorough understanding of the present invention. However, it will be obvious to those skilled in the art that the present invention may be practiced without such specific details. In other instances, well-known circuits and sub-systems may have been shown in block diagram form in order not to obscure the present invention in unnecessary detail. For the most part, details such as specific clock frequency, cycle time, etc. have not been included.

Refer now to the drawings wherein depicted elements are not necessarily shown to scale and wherein like or similar elements are designated by the same reference numeral through the several views. In the following explanation, a bus master (BM) that is requesting a bus access may be referred to as a "requesting BM" for simplification. An arbitration bus interval may be referred to as a bus interval (B) for simplification. Grant Balance Factors (hereafter GBFs) are values that are stored in Grant Balance Registers (GBRs) that may be selectively decremented. In the following, instead of referring to decrementing the GBR, the GBF is decremented indicating that the GBF value stored in the GBR is reduced by one.

Figure 5:
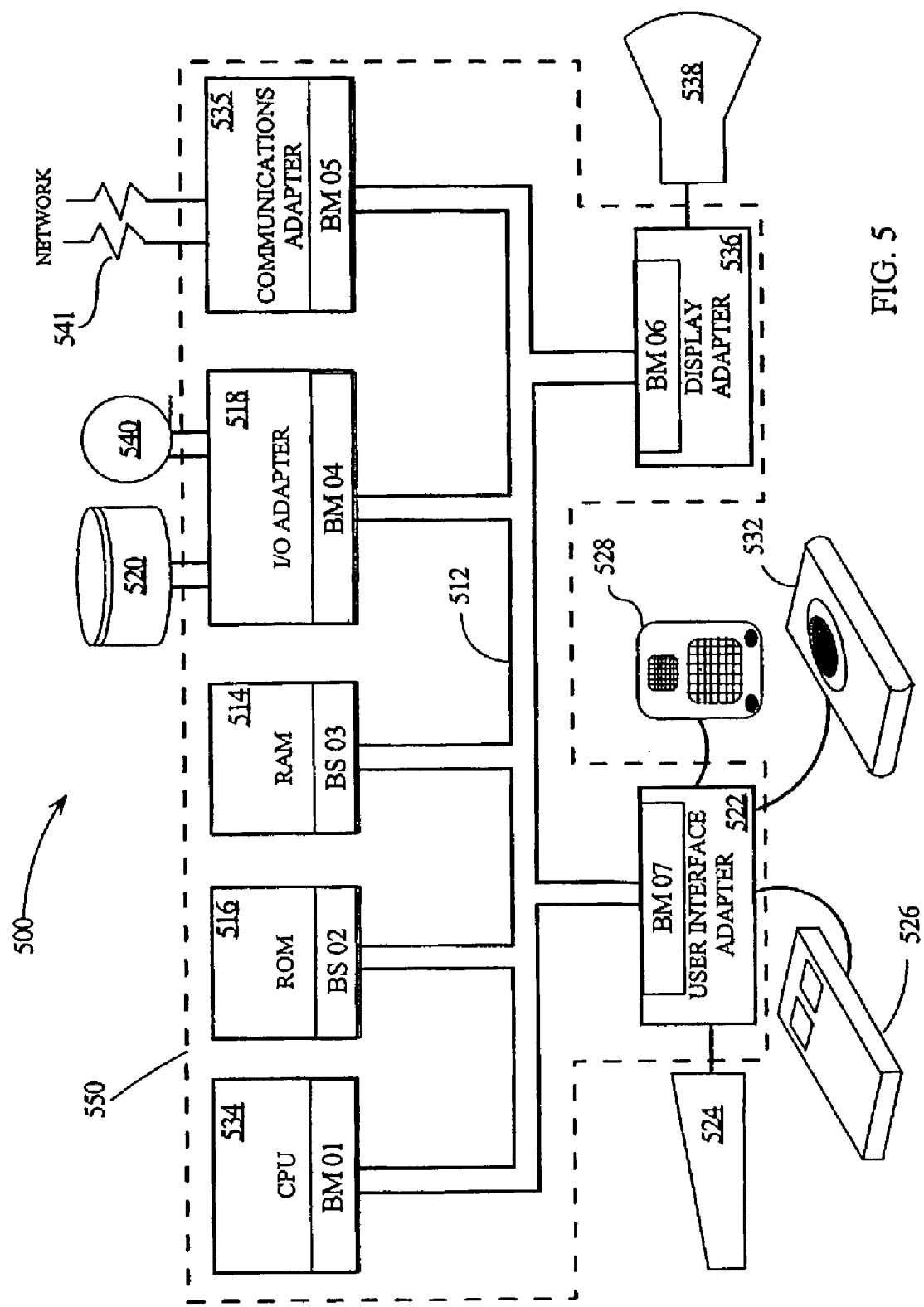
FIG. 5 is a block diagram of a data processing system with a central processing system that may contain a processor with a processor local bus (PLB) or an I/O bus that employs bus arbitration according to embodiments of the present invention.

FIG. 5 is a block diagram of a data processing system 500 configured to use embodiments of the present invention. Central Processing Unit (CPU) 534, Read Only Memory (ROM) 516, Random Access Memory (RAM) 514, I/O adapter 518, Communications Adapter 535, User Interface Adapter 522, and Display Adapter 536 are examples of functional units with interface units that are communicating on a bus 512. These functional units have either BM (request initiators) interface units (e.g. BM 01, BM 04 and BM 05–BM 07) or bus slave (BS) (request receivers) interface units (e.g., BS 02 and BS 03). Bus 512 may be managed to give requesting BMs access using a fair arbiter (not shown). Using embodiments of the present invention, selected BMs may be guaranteed a particular bus bandwidth and other requesting BMs may not be starved off the bus. I/O Adapter 518 may be coupled to tape drive 540 or disk drive 520 for storing data. Communications adapter 535 enables CPU 534 to communicate with remote functional units via network 541. Display Adapter 536 is coupled to display 538 for display data from CPU 534. User Interface Adapter 522 may be used to couple user input/output functional units like keyboard 524, mouse 526, track ball device 532, and speaker 528.

System 550, in data processing system 500, comprising CPU 534, ROM 516, RAM 514, I/O Adapter 518, Communications Adapter 535, User Interface Adapter 522 and Display Adapter 536 may all reside on a system-on-a-chip integrated circuit (IC). Bus 512 would then be considered a processor local bus (PLB). In this system-on-a-chip (system 550), access to PLB (Bus 512) for functional units CPU 534, ROM 516, RAM 514, I/O Adapter 518, Communications Adapter 535, User Interface Adapter 522 and Display Adapter 536 is managed by corresponding bus masters BM 01 and BM 04–BM 07. Embodiments of the present invention are used to give each of selected requesting BMs within BM 01 and BM 04–BM 07 a guaranteed bus bandwidth while insuring that BMs without a guaranteed bandwidth are not locked out from access to Bus 512.

Figure 6:
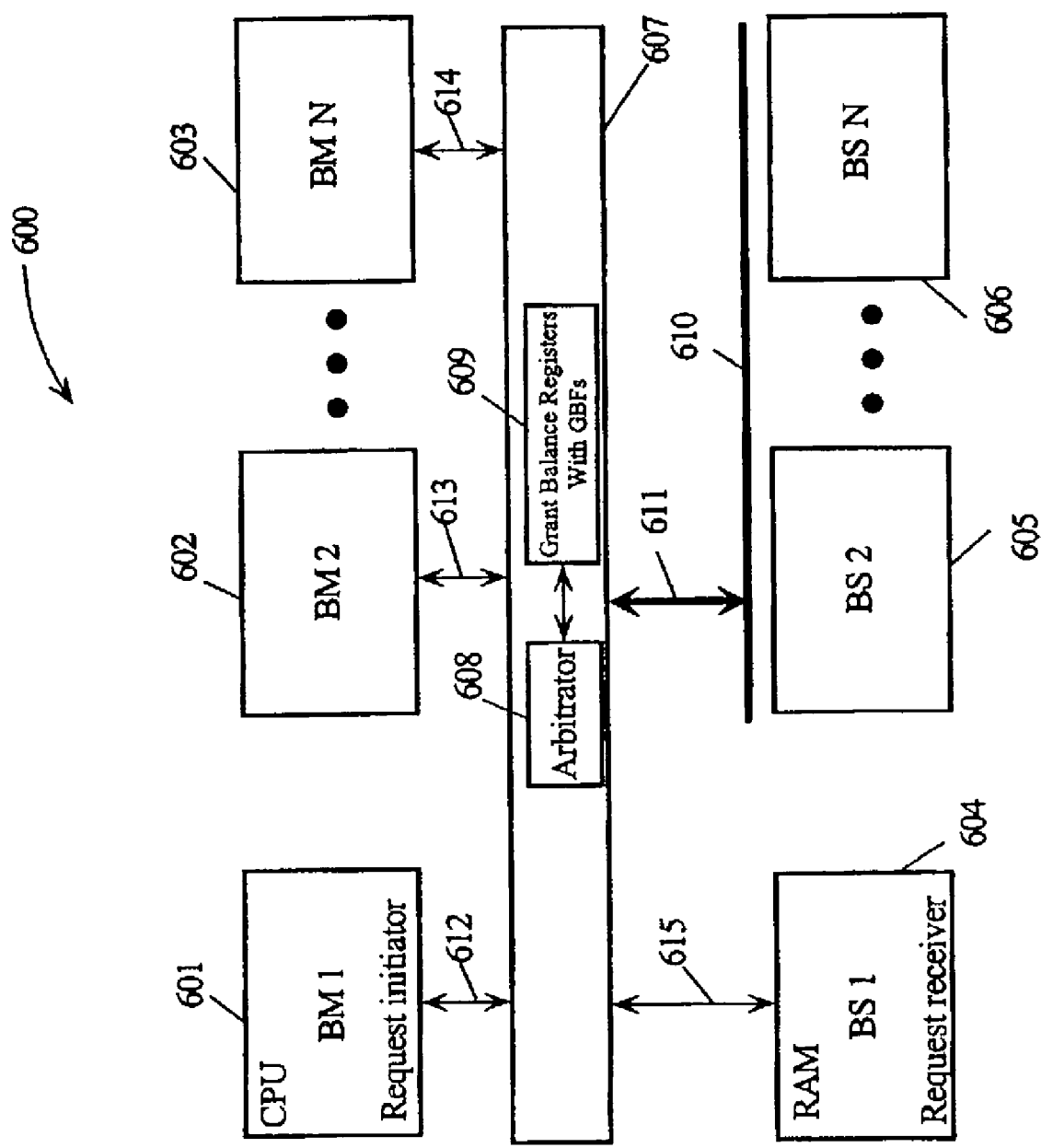
FIG. 6 is a block diagram illustrating a communication network according to embodiments of the present invention connecting bus master interface units and slave interface units.

FIG. 6 is a block diagram of a system 600 according to embodiments of the present invention. Units 601–603 incorporate BM interfaces for controlling access to the communication link 607 (bus or switch) between these and other units. Units 601–6 03 have BM 1–BM N and are units that are considered "request initiators." For example, BM 1–BM N make an access request to arbitrator 608 and an access is granted as the result of arbitration between the requesting master and other masters with the same priority. A central processing unit (CPU) is a device that would have a master interface since it may need to request information from random access memory (RAM) (shown in unit 604) therefore it would be a "request initiator." Unit 604 with RAM is a BS unit and is a "request receiver." For example, RAM would not typically request an access to the bus, but rather, it would receive a signal from a BM interface (request initiator) requesting that information stored in the RAM be read and forwarded over the communication link to the requesting unit (e.g., CPU in unit 601). Since access to the RAM in unit 604 may have only one port, a requesting master would have to be granted access by the arbitrator 608 based on some protocol. Units 601–603 with BM 1–BM N have direct access to the communication link 607 via connections 612–614 and unit 604 with Slave 1 has direct connection 615. Units may also have a shared bus connection to communication link 607. Units 605–606 are connected to communication link 607 via connection 611 and shared bus 610. GBRs 609 contain the GBFs for each master and are accessed for use by arbitrator 608 or during an update process to establish new GBF values.

FIG. 1 is a flow diagram 100 detailing method steps in one embodiment of the present invention. In step 101, each BM managing access to a bus is assigned a GBF. The number of clock cycles (n cycles) for each access time determining a bus interval (BI) is also set. In step 102, a test is done to determine if there are any "first" BMs. Hereafter, a first BM is defined as a BM that is requesting bus access and also had an initial GBF greater than zero. If the result of the test is YES, then in step 103 bus request access is granted to a selected first BM using a fair arbitration starting with the first BMs with the highest GBF. The GBF of the selected first BM is decremented by one if the GBF is greater than zero. Step 104, is an optional step where a first BM whose GBF has been decremented to zero is removed from the arbitration queue. A branch is then taken to step 107 where a test is done to determine if a present BI has expired. If the result of the test in step 107 is YES, then in step 108 all the GBFs are reset to their initial programmed values. A branch is then taken back to step 102. If the result of the test in step 107 is NO, then in step 109 a test is done to determine if an activity period with no access request has expired. This is an optional step where a decision to reset the GBFs is made prior to expiration of a present B. If the result of the test in step 109 is NO, then a branch is taken directly back to step 102 where arbitration continues amongst first BMs which have not had their GBF decremented to zero. If the result of the test in step 109 is YES, then an interrupt may be issued to stop the BI. A branch is then taken to step 108 where the GBFs are reset to their initial programmed value.

If the result of the test in step 102 is NO, then there are no first BMs with a GBF greater than zero. A test is then done in step 105 to determine whether there are any second BMs requesting access. Hereafter, a "second" BM is defined as a BM requesting access with an initial GBF equal to zero. A first BM with a GBF that has decremented to zero may be treated differently than a second BM that had an initial GBF equal to zero. If the result of the test in step 105 is YES, then in step 106 a selected second BM is granted access using fair arbitration. Step 107 is then executed as described previously. If the result of the test in step 105 is NO, then a test is done in step 110 to determine if there are any first BMs whose GBF are now zero that are requesting an access. If the result of the test in step 110 is YES, then step 103 is again executed and first BMs with GBFs equal to zero are given an opportunity to have additional access requests granted. If the result of the test in step 110 is NO, then step 107 is again executed awaiting time out of the present BI.

Figure 2:
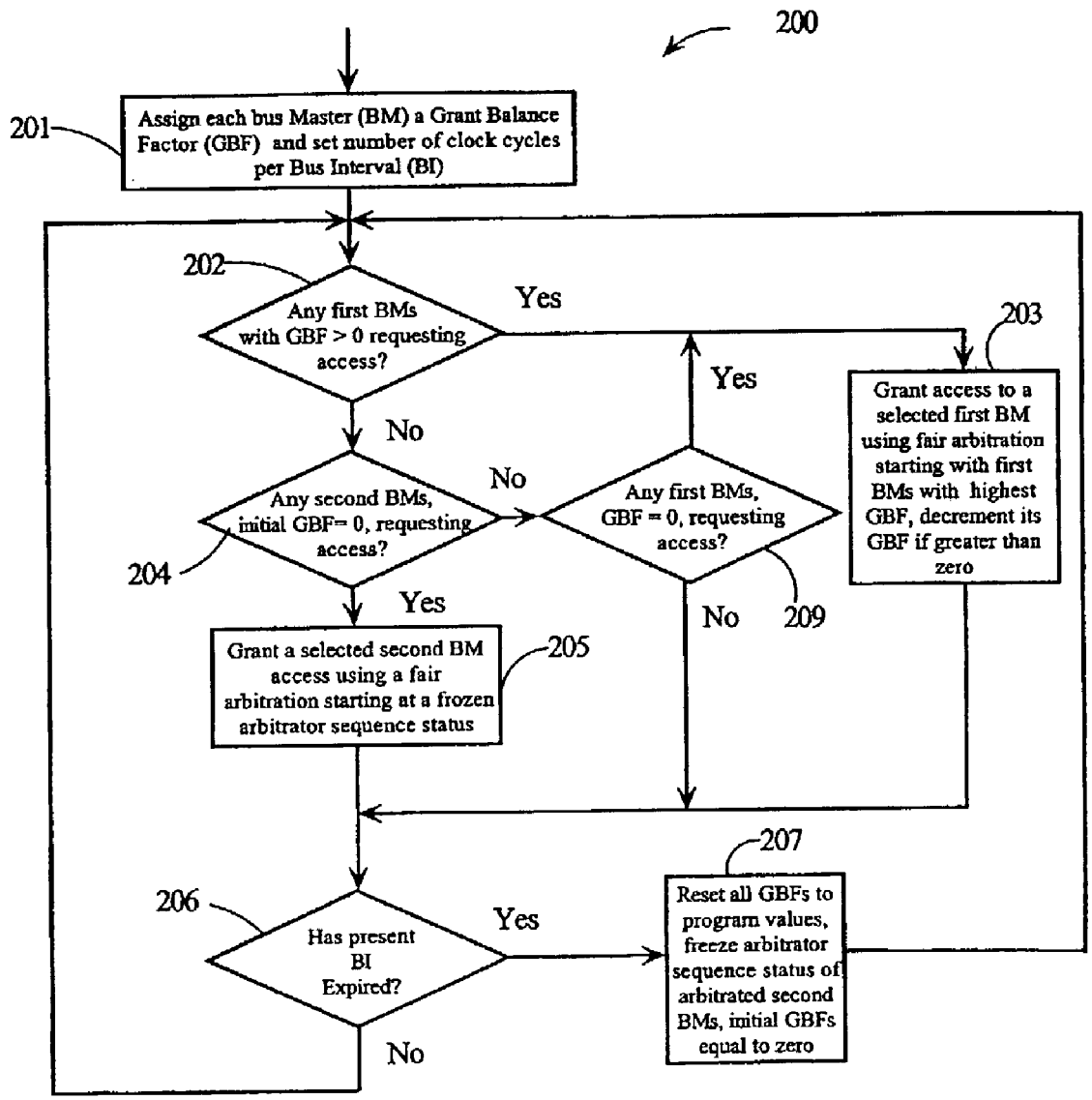
FIG. 2 is a flow diagram of method steps in another embodiment of the present invention where the status of the arbiter is frozen after a bus interval (BI) has expired.

FIG. 2 is a flow diagram 200 detailing method steps in another embodiment of the present invention. In step 201, each BM managing access to a bus is assigned a GBF. The number of clock cycles (n cycles) for each access time determining a bus interval (BI) is also set. In step 202, a test is done to determine if there are any first BMs requesting bus access with GBFs greater than zero. If the result of the test in step 202 is YES, then in step 203 an access is granted to a selected first BM using a fair arbitration starting with the first BMs with the highest GBF. The GBF of the selected first BM is decremented by one if the GBF is greater than zero. A branch is then taken to step 206 where a test is done to determine if a present BI has expired. If the result of the test in step 206 is YES, then in step 207 all the GBFs are reset to their initial programmed values and an arbiter sequence status determined during arbitration of second BMs is frozen. A branch is then taken back to step 202 where arbitration continues among any first BMs with a GBF greater than zero. If the result of the test in step 206 is NO, then a branch is taken directly back to step 202.

If the result of the test in step 202 is NO, then there are no requesting first BMs with a GBF greater than zero. A test is then done in step 204 to determine whether there are any second BMs requesting access. If the result of the test in step 204 is YES, then in step 205 a selected second BM is granted access using fair arbitration starting at a "frozen" arbitration sequence status. If this is the first time second BMs have been arbitrated for access, then the frozen sequence status is the initial round robin location, otherwise it is the arbitration sequence status stored from the previous arbitration of second BMs preceding expiration of the corresponding BI.

After an access is granted to second BMs from step 205, step 206 is then executed. If the result of the test in step 204 is NO, then a test is done in step 209 to determine if there are any first BMs (BMs whose initial GBF was greater than zero) whose GBF is now zero that are requesting an access. If the result of the test in step 209 is YES, then step 203 is again executed and first BMs with GBFs equal to zero are given an opportunity to have additional access requests granted. If the result of the test in step 209 is NO, then step 206 is again executed awaiting time out of the present BI.

Figure 3:
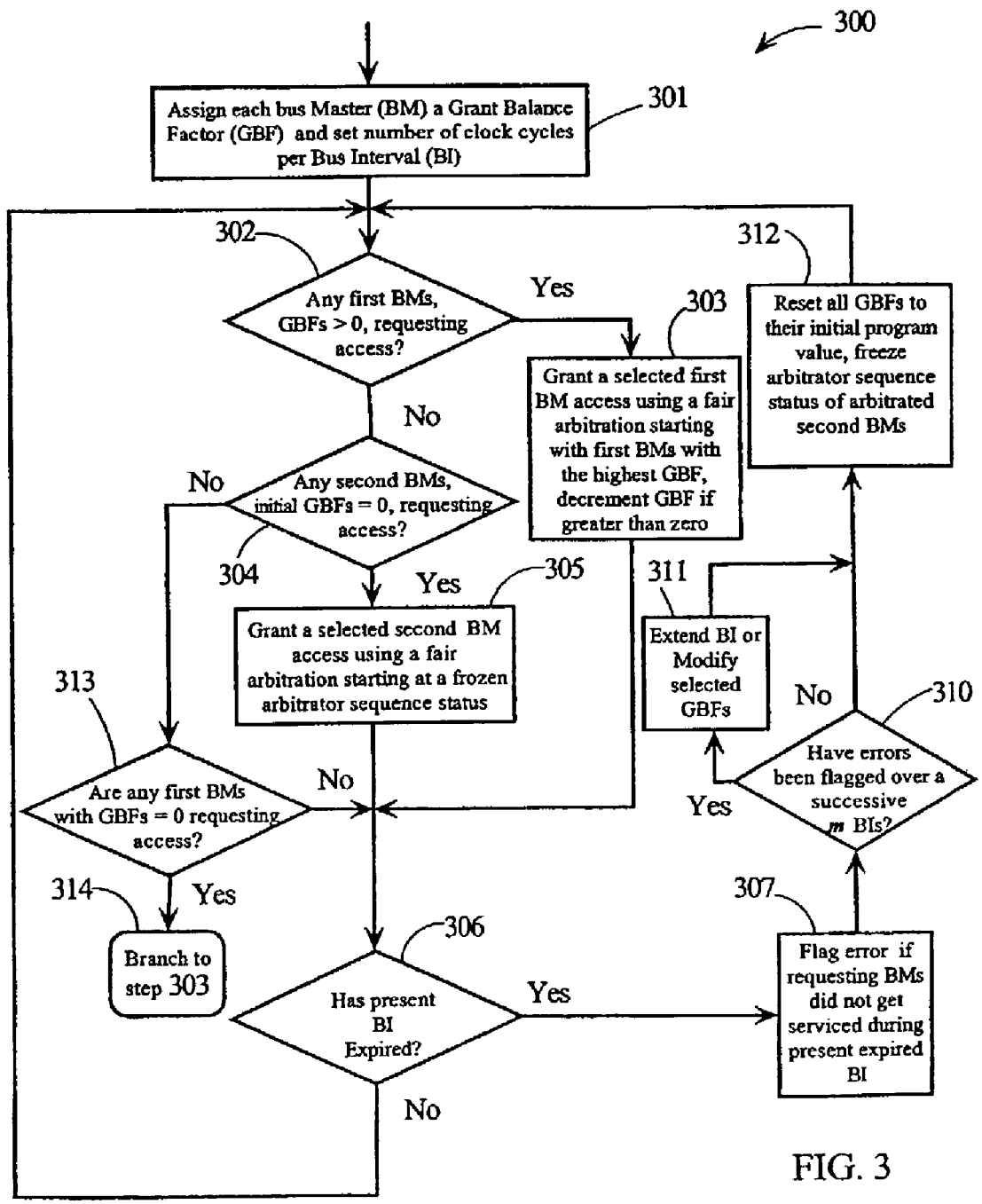
FIG. 3 is a flow diagram of method steps in an embodiment of the present invention where the BI may be dynamically modified.

FIG. 3 is a flow diagram 300 detailing method steps in another embodiment of the present invention. In step 301, each BM managing access to a bus is assigned a GBF. The number of clock cycles (n cycles) for each access time determining a bus interval (BI) is also set. In step 302, a test is done to determine if there are any first BMs requesting bus access. If the result of the test in step 302 is YES, then in step 303 a bus access is granted to a selected first BM using a fair arbitration starting with the first BMs with the highest GBF. The GBF of the selected first BM is decremented by one if the GBF is greater than zero. A branch is then taken to step 306 where a test is done to determine if a present BI has expired. The branches taken after the test in step 306 will be explained following the explanation of steps leading to step 305 which also leads to step 306.

If the result of the test in step 302 is NO, then there are no first BMs with a GBF greater than zero. A test is done in step 304 to determine whether there are any second BMs requesting access. If the result of the test in step 304 is YES, then in step 305 a selected second BM is granted access using fair arbitration starting at a "frozen" sequence status of the arbiter. If this is the first time second BMs have been arbitrated for access, then the frozen sequence status is the initial round robin location, otherwise it is the arbitration sequence status stored from the previous arbitration of second BMs preceding expiration of the corresponding BI.

In step 306, a test is done to determine if a present BI has expired. If the result of the test in step 306 is YES, then in step 307 an error is flagged if requesting BMs did not get their requests serviced. The requesting BMs could be first BMs that did not get a request serviced or a second BM that never got a request serviced. In step 310, a test is done to determine if errors have been flagged over successive m BIs. If the result of the test in step 310 is YES, then the BI is extended or selected GBFs are modified in step 311 and step 312 is then executed. If the result of test in step 310 is NO, step 312 is executed next. In step 312, the arbiter sequence status resulting from arbitrating access for the second BMs is frozen and all the GBFs are reset to their initial programmed value. A branch is then taken back to step 302. If the result of the test in step 306 is NO, then a branch is taken directly back to step 302.

If the result of the test in step 304 is NO, then a test is done in step 313 to determine if there are any first BMs whose GBF has been decremented to zero that are requesting an access. If the result of the test in step 313 is YES, then a branch is taken back to step 303 and first BMs with GBFs equal to zero (there no requesting first BMs with GBFs greater than zero) are given an opportunity to have additional access requests granted. If the result of the test in step 313 is NO, then step 306 is again executed awaiting time-out of the present BI.

Figure 4A:
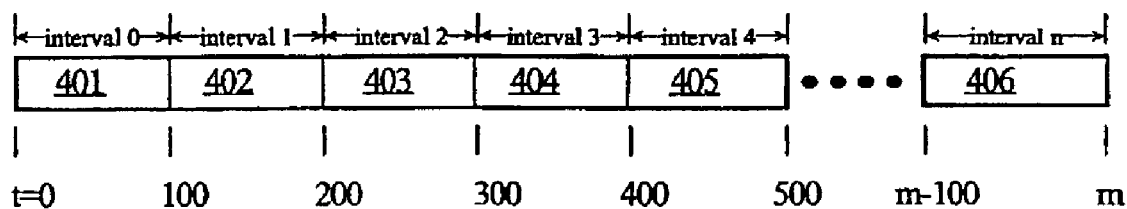
FIG. 4A illustrates the bus access time is partitioned into BIs.

FIG. 4A is a block diagram of the bus access time partitioned into BIs 401–406. In this particular example, each BI is partitioned into an arbitrary 100 clock cycles.

Figure 4B:
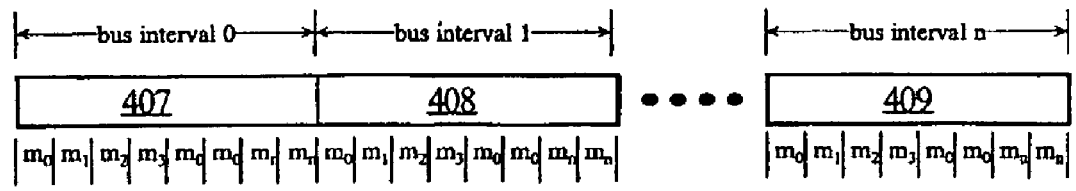
FIG. 4B illustrates exemplary BIs and which BMs have been granted bus access requests.

FIG. 4B is a block diagram of BIs 407–409 where the access time granted to each BM corresponds to the value of the index M (short for Master) where M0 corresponds to BM0, M1 corresponds to BM1, M2 corresponds to BM2, M3 corresponds to BM3 and Mn corresponds to one or more BMs with a zero guaranteed access time. For example, let M0=3, M1=1, M2=1, M3=1 and Mn=0. To insure these relative guaranteed access times (M0–Mn), the BM would be assigned corresponding GBFs wherein the highest GBF would go to the BM with the highest guaranteed access time. In this example, the BI (e.g., each of BI0–BIn) has 8 access periods. In this example, all BMs are assumed to be continuously requesting a bus access). M0 has the highest GBF and was granted the first access. The GBF of M0 will then be decremented. In the second period, M0 still has the highest GBF but is not requesting an access so the arbiter chooses from among M1–Mn. Of the remaining BMs, M1–M3 have the same priority. Since they all are requesting, the arbiter would pick the first one polled by a fair arbitration. M1, M2, and M3 are sequentially granted a request and their GBFs are decremented by one to zero. In the fifth period M0 is again requesting; its GBF is 2 so it is the highest priority regardless of other requests so it is granted the next access and its GBF is decremented to 1. In the sixth period M0 is still the highest priority and is again granted an access and it GBF is decremented to zero. In the seventh and eighth periods all the BMs (M0–Mn) have the same GBF of zero. In this case, the arbiter considers all the remaining BMs as equals, including Mn which had no guaranteed access time. In the seventh and eighth period, Mn is the only requesting BM that had an initial GBF equal to zero and it is granted access in both these time periods. BI0–BIn are shown to have the same granted accesses to each BM. This would only occur if, during each B, the BMs had exactly the same bus requests during each of the illustrated BI time periods.

Figure 4C:
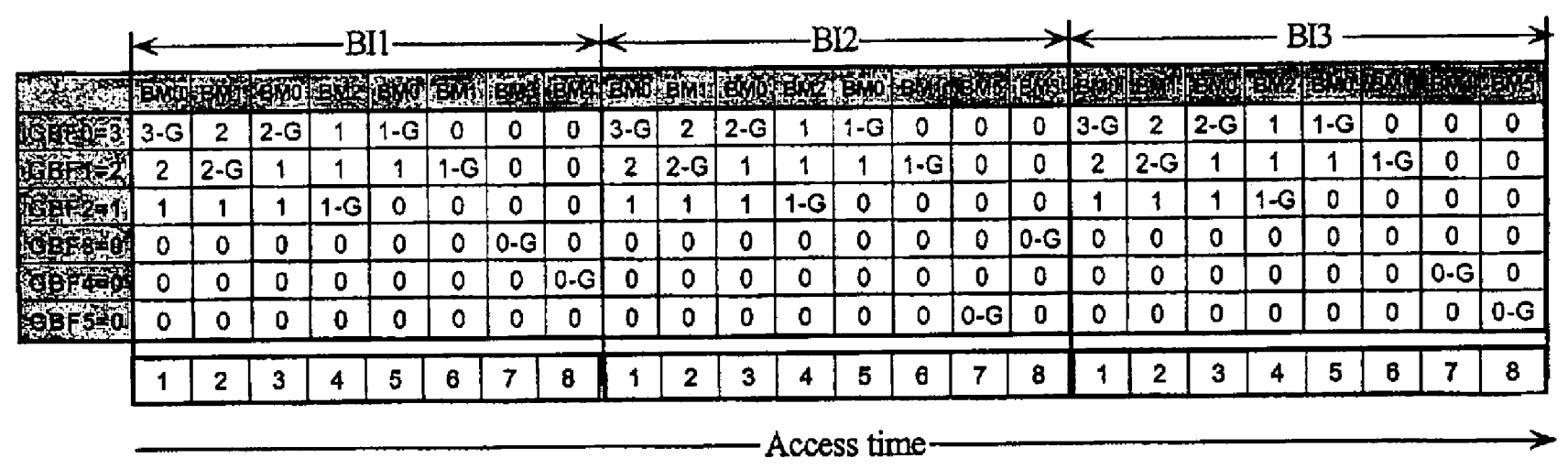

FIG. 4C is a diagram of three BIs, BI1–BI3, illustrating an embodiment of the present invention using a frozen arbiter sequence status. For this example, all of the BMs are assumed to be continuously requesting a bus access to simplify the explanation. BM0–BM5, have initial GBFs corresponding to GBF0=3, GBF1=2, GBF2=1, GBF3=0, GBF4=0, and GBF5=0. The diagram row headings correspond to initial GBFs and the column headings correspond to which BM is granted an access during a particular access time. The individual cell values indicate the value of the GBFs during an access time. Also, a cell that has a "G" indicates that this particular BM was granted the access during the access time. For example, in BI1 access time one, BM0 is granted an access and its GBF is equal to three before being decremented. The GBFs of BM1–BM5 are 2, 1, 0, 0, and 0 respectively. In access time two, the GBF0 has been decremented to two and BMI which now has the same priority as BM0 is granted the access by fair arbitration. Fair arbitration continues among the BMs with the highest GBFs until all GBFs are equal to zero. In BI1, this occurs in access time 7. At access time 7, all the BMs have equal GBF as the BMs which had initial GBFs greater than zero have had there guaranteed access times fulfilled.

In access time 7, the arbiter switches to the BMs which did not have guaranteed access times (BM3–BM5 had GBFs equal to zero). The arbiter starts polling starting with a frozen previous sequence status. Since this is the first BI and there is no previous sequence status and thus the frozen status is the present initial status. Since it was assumed that all BMs were continuously requesting access, BM3 is granted an access during access time 7 and then BM4 is granted an access in access time 8. After access time 8, a new BI2 starts (BI1 ended) and all GBFs are reset to their initial programmed values and the sequence status of granting accesses for the BMs with an initial GBF equal to zero is "frozen" becoming the frozen sequence status. Now in BI2 period one, BM0 is again the highest priority and accesses are granted in accordance with the sequence described for BI1. This is true because of the assumed condition that all BMs are continuously requesting a bus access. As with BI1, all of the guaranteed bus access times are fulfilled at access time six. In BI1, BM5 did not get its request serviced. Because the sequence status of the arbiter relative to the BMs with an initial GBF equal to zero was frozen from BI1, BM5 is given priority during BI2 and its request is serviced first after the guaranteed access times for BM0–BM2 have been fulfilled. At the end of BI2, BM3 was the last bus request granted of the BMs with initial GBFs equal to zero. Freezing the arbiter status after BI2 guarantees that BM4 will have priority in BI3 after the guaranteed access times for BM0–BM2 have been fulfilled. FIG. 4C illustrates how the BMs without guaranteed access times all have been granted two accesses over the three bus intervals BI1–BI3.

In FIG. 4C, it took six access time periods for the guaranteed access times for BM0–BM2 to be fulfilled. If each of the bus intervals BI1–BI3 were only six time periods (not shown), none of the requesting BMs with a GBF equal to zero would have ever had their pending access requests granted. In one embodiment of the present invention, an error would be generated and stored when this happened. A programmed number m of BIs would determine if any action is taken based on the error condition. For example, with m equal to one, the BI may be extended to enable more access times in a BI when during a single BI a requesting BM with a GBF equal to zero did not get its bus access request serviced. Also, the GBFs of selected BMs may be modified to give better balance among requesting BMs. An m greater than one would require more than one successive BIs with an error condition before an BI extension or GBF modification was implemented. In another embodiment, an error condition may also be flagged if a BM with a GBF greater than zero was not getting serviced to its guaranteed access time during m successive BIs. Again in this case, the BI may be dynamically extended or selected GBFs may be modified to insure bandwidth guarantees are met.

Although the present invention and its advantages have been described in detail, it should be understood that various changes, substitutions and alterations can be made herein without departing from the spirit and scope of the invention as defined by the appended claims.

The invention claimed is:

1. A method of managing access to a bus comprising:
   (a) partitioning a bus access time to said bus into a plurality of bus intervals (BIs);
   (b) assigning, at the beginning of each of said BIs, an initial programmed Grant Balance Factor value (GBF) for each of a plurality of bus masters (BMs) managing access to said bus, generating a corresponding plurality of GBFs, each of said plurality of GBFs corresponding to a requested bus bandwidth;
   (c) arbitrating among requesting first BMs within said plurality of BMs, said first BMs having a highest GBF greater than zero during a present BI;
   (d) granting a bus access to a selected first BM in response to step (c);
   (e) decrementing by one a GBF of said selected first BM; and
   (e1) removing said selected first BM from an arbitration queue of said arbitrating step (c) if its GBF is equal to zero during said present BI.

2. The method of claim 1, further comprising the steps of:
   (f) arbitrating among requesting second BMs within said plurality of BMs, starting at a present arbitration sequence status, if there are no requesting first BMs, said second BMs having an initial GBF equal to zero during said present BI;
   (g) granting a bus access to a selected second BM in response to step (f); and
   (h) generating said present arbitration sequence status, in response to an expiration of said present BI, by freezing an arbitration sequence from arbitrating said second BMs during said present BI.

3. The method of claim 2 further comprising the steps of:
   arbitrating among requesting first BMs whose GBF has been decremented to zero during said present BI if there are no requesting first BMs with a GBF greater than zero or requesting second BMs; and
   granting a bus access to a selected first BM whose GBF has been decremented to zero.

4. The method of claim 3 further comprising the step of:
   resetting all of said plurality of GBFs to their initial programmed value if said present BI has expired.

5. The method of claim 2 further comprising the step of:
   resetting all of said plurality of GBFs to their initial programmed value if said present BI has expired.

6. The method of claim 1 further comprising the step of:
   resetting all of said plurality of GBFs to their initial programmed value if a predetermined activity period for access to said bus has expired.

7. The method of claim 1 further comprising the step of:
   resetting all of said plurality of GBFs to their initial programmed value if said present BI has expired.

8. A method of managing access to a bus comprising:
   (a) partitioning a bus access time to said bus into a plurality of bus intervals (BIs);
   (b) assigning, at the beginning of each of said BIs, an initial programmed Grant Balance Factor value (GBF) for each of a plurality of bus masters (BMs) managing access to said bus, generating a corresponding plurality of GBFs, each of said plurality of GBFs corresponding to a requested bus bandwidth;
   (c) arbitrating among requesting first BMs within said plurality of BMs, said first BMs having a highest GBF greater than zero during a present BI;
   (d) granting a bus access to a selected first BM in response to step (c);
   (e) decrementing by one a GBF of said selected first BM; and
   (f) removing said selected first BM from an arbitration queue of said arbitrating step (c) if its GBF is equal to zero during said present BI;
   (g) arbitrating among requesting second BMs within said plurality of BMs, starting at a present arbitration sequence status, if there are no requesting first BMs, said second BMs having an initial GBF equal to zero during said present BI;
   (h) granting a bus access to a selected second BM in response to step (g);
   (i) generating said present arbitration sequence status, in response to an expiration of said present BI, by freezing an arbitration sequence from arbitrating said second BMs during said present BI;
   (j) resetting all of said plurality of GBFs to their initial programmed value if said present BI has expired;
   (k) flagging an error and storing an identification of a missed BM in response to an expiration of said present BI, said missed BM one of said plurality of BMs that requested an access but was not serviced during one of said BIs.

9. The method of claim 8 further comprising the steps of:
   determining if said error has been flagged over a programmed number M of said BIs; and
   extending a time period for each of said plurality of BIs.

10. The method of claim 8 further comprising the steps of:
    determining if said error has been flagged over a programmed number M of said BIs; and
    modifying selected of said initial GBFs.

11. The method of claim 8 further comprising the steps of:
    arbitrating among requesting first BMs whose GBF has been decremented to zero during said present BI if there are no requesting first BMs with a GBF greater than zero or requesting second BMs; and
    granting a bus access to a selected first BM whose GBF has been decremented to zero.

12. The method of claim 11 further comprising the step of:
    resetting all of said plurality of GBFs to their initial programmed value if said present BI has expired.

13. The method of claim 8 further comprising the step of:
    resetting all of said plurality of GBFs to their initial programmed value if said present BI has expired.

14. The method of claim 8 further comprising the step of:
    resetting all of said plurality of GBFs to their initial programmed value if a predetermined activity period for access to said bus has expired.

15. A system-on-a-chip (SOC) integrated circuit comprising:
    a central processing unit (CPU);
    a random access memory (RAM);
    an input/output (I/O) adapter;
    a user interface adapter;
    a display adapter coupled to a display;
    a bus for coupling said CPU, RAM, I/O adapter, user interface adapter, and said display adapter;
    a plurality of bus masters (BMs), one of said plurality of bus masters in each of said CPU, I/O adapter, user interface adapter, and said display adapter for managing bus access;

circuitry for partitioning a bus access time to said bus into a plurality of bus intervals (BIs);

circuitry for assigning, at the beginning of each of said BIs, an initial programmed Grant Balance Factor value (GBF) for each of said plurality of BMs managing access to said bus, generating a corresponding plurality of GBFs, each of said plurality of GBFs corresponding to a requested bus bandwidth;

circuitry for arbitrating among requesting first BMs within said plurality of BMs, said first BMs having a highest GBF greater than zero during a present BI;

circuitry for granting a bus access to a selected first BM in response to arbitrating among requesting first BMs;

circuitry for decrementing by one a GBF of said selected first BM; and circuitry for removing said selected first BM from an arbitration queue of said fair arbiter if its GBF is equal to zero during said present BI.

16. The SOC of claim 15, further comprising:

circuitry for arbitrating among requesting second BMs within said plurality of BMs, starting at a present arbitration sequence status, if there are no requesting first BMs, said second BMs having an initial GBF equal to zero during said present BI;

circuitry for granting a bus access to a selected second BM in response to arbitrating among said requesting second BMs; and circuitry for generating said present arbitration sequence status, in response an expiration of said present BI, by freezing an arbitration sequence from arbitrating said second BMs during said present BI.

17. The SOC of claim 16 further comprising:

circuitry for arbitrating among requesting first BMs whose GBF has been decremented to zero during said present BI, if there are no requesting first BMs with a GBF greater than zero or requesting second BMs; and circuitry for granting a bus access to a selected first BM in response to arbitrating among requesting first BMs whose GBF has been decremented to zero during said present BI.

18. The SOC of claim 17 further comprising:

circuitry for resetting all of said plurality of GBFs to their initial programmed value if said present BI has expired.

19. The SOC of claim 16 further comprising:

circuitry for resetting all of said plurality of GBFs to their initial programmed value if said present BI has expired.

20. The SOC of claim 15 further comprising:

circuitry for resetting all of said plurality of GBFs to their initial programmed value if a predetermined activity period for access to said bus has expired.

21. The SOC of claim 15 further comprising:

circuitry for resetting all of said plurality of GBFs to their initial programmed value if said present BI has expired.

22. A system-on-a-chip (SOC) integrated circuit comprising:

a central processing unit (CPU);
a random access memory (RAM);
an input/output (I/O) adapter;
a user interface adapter;
a display adapter coupled to a display;
a bus for coupling said CPU, RAM, I/O adapter, user interface adapter, and said display adapter;
a plurality of bus masters (BMs), one of said plurality of bus masters in each of said CPU, I/O adapter, user interface adapter, and said display adapter for managing bus access;

circuitry for partitioning a bus access time to said bus into a plurality of bus intervals (BIs);

circuitry for assigning, at the beginning of each of said BIs, an initial programmed Grant Balance Factor value (GBF) for each of said plurality of BMs managing access to said bus, generating a corresponding plurality of GBFs, each of said plurality of GBFs corresponding to a requested bus bandwidth;

circuitry for arbitrating among requesting first BMs within said plurality of BMs, said first BMs having a highest GBF greater than zero during a present BI;

circuitry for granting a bus access to a selected first BM in response to arbitrating among requesting first BMs;

circuitry for decrementing by one a GBF of said selected first BM; and circuitry for removing said selected first BM from an arbitration queue of said fair arbiter if its GBF is equal to zero during said present BI;

circuitry for arbitrating among requesting second BMs within said plurality of BMs, starting at a present arbitration sequence status, if there are no requesting first BMs, said second BMs having an initial GBF equal to zero during said present BI;

circuitry for granting a bus access to a selected second BM in response to arbitrating among said requesting second BMs;

circuitry for generating said present arbitration sequence status, in response an expiration of said present BI, by freezing an arbitration sequence from arbitrating said second BMs during said present BI;

circuitry for resetting all of said plurality of GBFs to their initial programmed value if said present BI has expired;

circuitry for flagging an error and storing an identification of a missed BM in response to an expiration of said present BI, said missed BM one of said plurality of BMs that requested an access but was not serviced during one of said BIs.

23. The SOC of claim 22 further comprising:

circuitry for determining if said error has been flagged over a programmed number M of said BIs; and circuitry for extending a time period for each of said plurality of BIs.

24. The SOC of claim 22 further comprising:

circuitry for determining if said error has been flagged over a programmed number M of said BIs; and circuitry for modifying selected of said initial GBFs.

25. The SOC of claim 22 further comprising:

circuitry for arbitrating among requesting first BMs whose GBF has been decremented to zero during said present BI, if there are no requesting first BMs with a GBF greater than zero or requesting second BMs; and circuitry for granting a bus access to a selected first BM in response to arbitrating among requesting first BMs whose GBF has been decremented to zero during said present BI.

26. The SOC of claim 25 further comprising circuitry for resetting all of said plurality of GBFs to their initial programmed value if said present BI has expired.

27. The SOC of claim 22 further comprising circuitry for resetting all of said plurality of GBFs to their initial programmed value if said present BI has expired.

28. The SOC of claim 22 further comprising circuitry for resetting all of said plurality of GBFs to their initial programmed value if a predetermined activity period for access to said bus has expired.

29. A method
of managing access to a bus comprising:
(a) partitioning a bus access time to said bus into a plurality of bus intervals (BIs);
(b) assigning, at the beginning of each of said Bk, an initial programmed Grant Balance Factor value (GBF)

for each of a plurality of bus masters (BMs) managing access to said bus, generating a corresponding plurality of GBFs, each of said plurality of GBFs corresponding to a requested bus bandwidth;

(c) arbitrating among requesting first BMs within said plurality of BMs, said first BMs having a highest GBF greater than zero during a present BI;

(d) granting a bus access to a selected first BM in response to step (c); and (e) decrementing by one a GBF of said selected first BM;

(f) arbitrating among requesting second BMs within said plurality of BMs, starting at a present arbitration sequence status, if there are no requesting first BMs, said second BMs having an initial GBF equal to zero during said present BI;

(g) granting a bus access to a selected second BM in response to step (f); and (h) generating said present arbitration sequence status, in response to an expiration of said present BI, by freezing an arbitration sequence from arbitrating said second BMs during said present BI;

resetting all of said plurality of GBFs to their initial programmed value if said present BI has expired;

flagging an error and storing an identification of a missed BM in response to an expiration of said present BI, said missed BM one of said plurality of BMs that requested an access but was not serviced during one of said BIs.

30. The method of claim 29 further comprising the steps of:
arbitrating among requesting first BMs whose GBF has been decremented to zero during said present BI if there are no requesting first BMs with a GBF greater than zero or requesting second BMs; and
granting a bus access to a selected first BM whose GBF has been decremented to zero.

31. The method of claim 30 further comprising the step of:
resetting all of said plurality of GBFs to their initial programmed value if said present BI has expired.

32. The method of claim 29 further comprising the step of:
resetting all of said plurality of GBFs to their initial programmed value if a predetermined activity period for access to said bus has expired.

33. The method of claim 29 further comprising the steps of:
determining if said error has been flagged over a programmed number M of said BIs; and
extending a time period for each of said plurality of BIs.

34. The method of claim 29 further comprising the steps of:
determining if said error has been flagged over a programmed number M of said BIs; and
modifying selected of said initial GBFs.

35. A system-on-a-chip (SOC) integrated circuit comprising:
a central processing unit (CPU);
a random access memory (RAM);
an input/output (I/O) adapter;
a user interface adapter;
a display adapter coupled to a display;
a bus for coupling said CPU, RAM, I/O adapter, user interface adapter, and said display adapter;
a plurality of bus masters (BMs), one of said plurality of bus masters in each of said CPU, I/O adapter, user interface adapter, and said display adapter for managing bus access;

circuitry for partitioning a bus access time to said bus into a plurality of bus intervals (BIs);

circuitry for assigning, at the beginning of each of said BIs, an initial programmed Grant Balance Factor value (GBF) for each of said plurality of BMs managing access to said bus, generating a corresponding plurality of GBFs, each of said plurality of GBFs corresponding to a requested bus bandwidth;

circuitry for arbitrating among requesting first BMs within said plurality of BMs, said first BMs having a highest GBF greater than zero during a present BI;

circuitry for granting a bus access to a selected first BM in response to arbitrating among requesting first BMs;

circuitry for decrementing by one a GBF of said selected first BM;

circuitry for arbitrating among requesting second BMs within said plurality of BMs, starting at a present arbitration sequence status, if there are no requesting first BMs, said second BMs having an initial GBF equal to zero during said present BI;

circuitry for granting a bus access to a selected second BM in response to arbitrating among said requesting second BMs;

circuitry for generating said present arbitration sequence status, in response an expiration of said present BI, by freezing an arbitration sequence from arbitrating said second BMs during said present BI;

circuitry for resetting all of said plurality of GBFs to their initial programmed value if said present BI has expired; and circuitry for flagging an error and storing an identification of a missed BM in response to an expiration of said present BI, said missed BM one of said plurality of BMs that requested an access but was not serviced during one of said BIs.

36. The SOC of claim 35 further comprising:
circuitry for arbitrating among requesting first BMs whose GBF has been decremented to zero during said present BI, if there are no requesting first BMs with a GBF greater than zero or requesting second BMs; and
circuitry for granting a bus access to a selected first BM in response to arbitrating among requesting first BMs whose GBF has been decremented to zero during said present BI.

37. The SOC of claim 36 further comprising:
circuitry for resetting all of said plurality of GBFs to their initial programmed value if said present BI has expired.

38. The SOC of claim 35 further comprising:
circuitry for resetting all of said plurality of GBFs to their initial programmed value if a predetermined activity period for access to said bus has expired.

39. The SOC of claim 35 further comprising:
circuitry for determining if said error has been flagged over a programmed number M of said BIs; and
circuitry for extending a time period for each of said plurality of BIs.

40. The SOC of claim 35 further comprising:
circuitry for determining if said error has been flagged over a programmed number M of said BIs; and
circuitry for modifying selected of said initial GBFs.

* * * * *